Patented Feb. 11, 1930

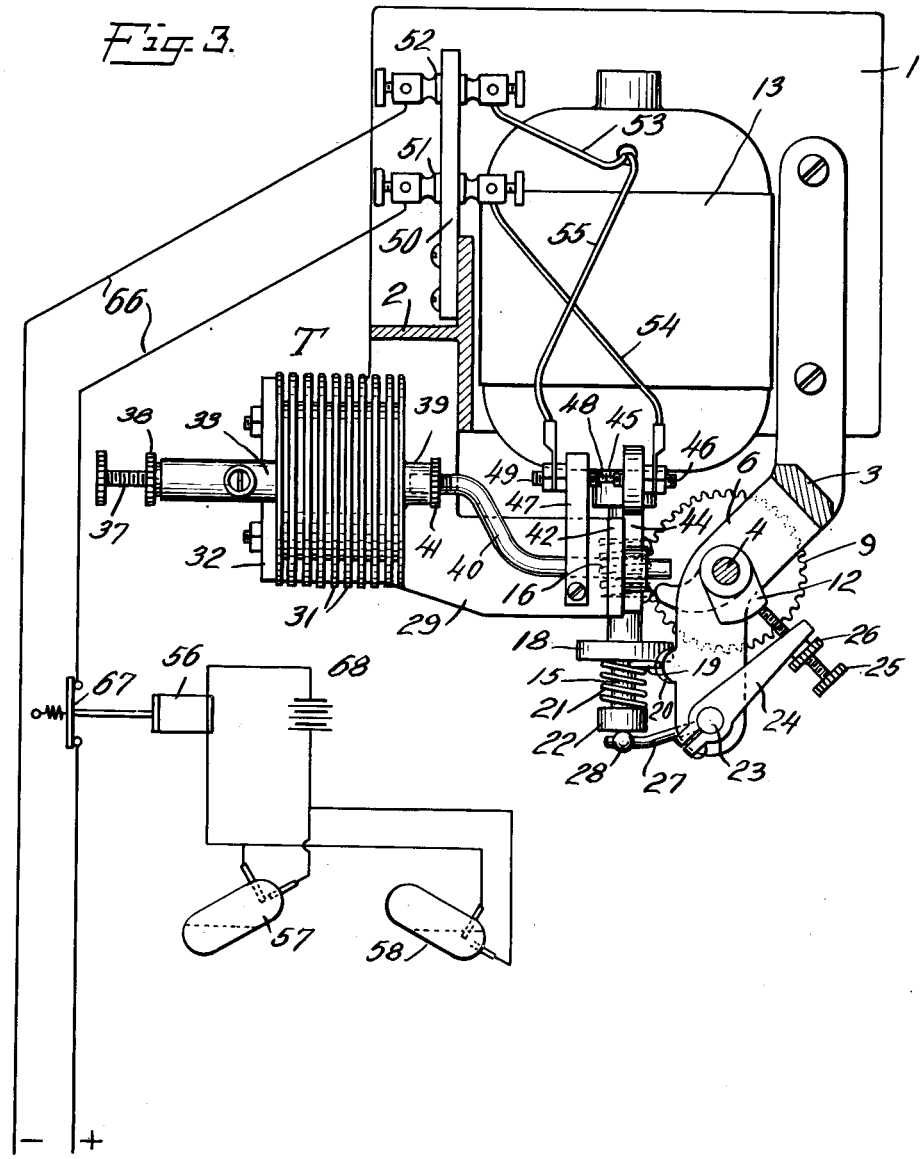

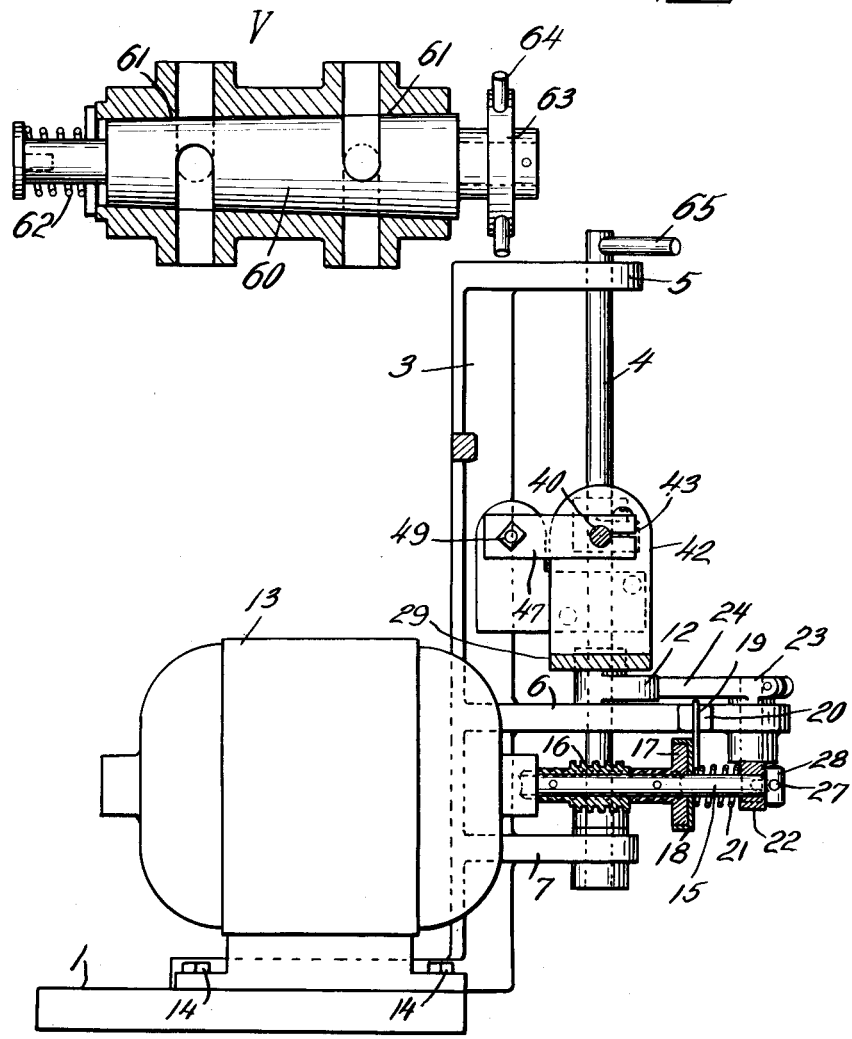

1,746,866

UNITED STATES PATENT OFFICE

HAROLD L. PARR AND JOHN H. NELSEN, OF EAST MOLINE, ILLINOIS, ASSIGNORS TO THE STANDARD CALORIMETER CO., OF EAST MOLINE, ILLINOIS, A CORPORATION OF ILLINOIS

VALVE CONTROL MECHANISM

Application filed January 5, 1927. Serial No. 159,223.

This invention relates to control mechanism, and more particularly concerns electrically operated control mechanism for use in the control of devices requiring successive operation at predetermined time intervals.

In certain measuring devices, control systems and other forms of apparatus, it is necessary or desirable to provide automatic means for performing a given operation or set of operations at successive time intervals. For example, in connection with certain gas calorimeters, automatic means are required for opening and closing valves to permit the flow of fluids through various passages into reservoirs or containers, the volume of fluid flowing being controlled by the time interval during which the valves are permitted to remain in a given condition. Also, in certain types of street traffic control systems it is desirable to provide means for periodically opening and closing control circuits for signal lights, or to otherwise change the indications displayed by suitable traffic signals at predetermined time intervals.

Automatic control means of this type should preferably be constructed to operate in an accurate and reliable manner, the time intervals between the successive operations thereof should preferably be of equal and adjustable duration, and in general the control means should be designed and constructed to operate for extended periods of time with a minimum amount of maintenance, adjustment or other attention.

With the above and other considerations in mind, it is proposed in accordance with the present invention to provide apparatus comprising a control means which operates to successively perform a given function at predetermined time intervals, and, more specifically, it is proposed to provide a control means of this type in which the time intervals between successive operations may be accurately adjusted, and which is designed and constructed to perform the required functions in a positive and reliable manner.

Other specific objections, advantages and characteristic features of the invention will be pointed out or will become apparent as the detailed description thereof progresses.

In describing the invention in detail, reference will be made to the accompanying drawings, in which:

Fig. 3 is a sectional view taken along the line 3—3 of Fig. 1, and viewed in the direction of the arrows, this figure including a diagrammatic representation of a typical circuit for use in connection with the apparatus of the present invention; and Fig. 4 is a sectional view taken along the line 4—4 of Fig. 1 and viewed in the direction of the arrows.

Figure 1:
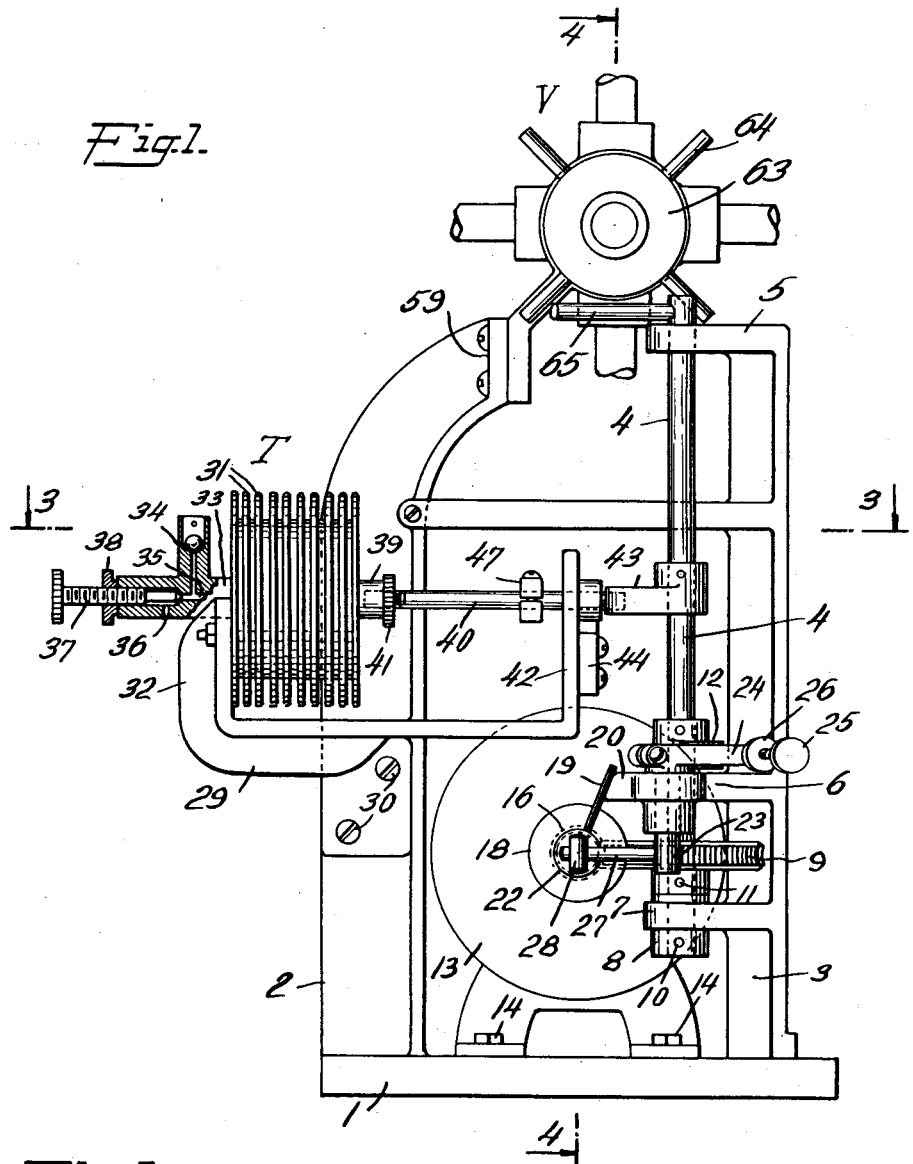
Figure 1 is a side view of the control apparatus of the present invention.

The control apparatus of the present invention comprises in general a base 1 having two substantially vertical supports 2 and 3 integral therewith or suitably secured thereto. A vertical shaft 4 is journalled in suitable extensions 5, 6 and 7 on the support 3, and is held against axial movement by a collar 8 and a worm gear 9, which members are fixed below and above the extension 7 respectively by suitable means such as the pins 10 and 11. The shaft 4 also carries a brake cam 12 secured thereto at a point just above the extension 6 as shown.

An electric motor 13 is secured to the base 1 by the cap screws 14, and the shaft 15 of this motor carries a worm 16, suitably fixed thereto and engaging the worm gear 9 on the vertical shaft 4. The motor shaft 15 also carries a brake drum 17, which is engaged by a brake shoe or disk 18. The disk 18 is rotatably journalled on the shaft 15, and is held against rotation therewith by the radially extending rod 19, suitably secured to the disk 18, and engaging a lug 20 on the extension 6, as clearly shown in Figs. 1 and 3. A coiled spring 21 encircles the shaft 15 and engages the disk 18, the outer end of this spring being engaged by a collar 22, which is rotatably journalled on the end of the motor shaft. The spring 21 and the collar 22 are so constructed and arranged that the outer end of the collar extends a short distance beyond the end of the motor shaft 15 when the spring 21 is fully expanded and no pressure is being applied to the brake shoe 18.

A short vertical shaft 23 is journalled in the extension 6 of the support 3, and carries a cam lever 24 suitably fixed to the upper end thereof, as shown in Figs. 3 and 4. An adjustable set screw 25, having a lock nut 26 thereon, is threaded through the outer end of the lever 24 at right angles thereto, and extends therefrom in a position to be engaged by the cam 12 at a certain point in the rotation of the shaft 4. A second lever or arm 27 is fixed to the lower end of the shaft 23, the outer end of this arm having an enlarged and rounded portion 28, which engages the outer end of the collar 22 on the shaft 15.

From a study of the brake apparatus described, it will be apparent that at a certain point in the rotation of the shaft 4, the cam 12 engages the set screw 25, moving the lever 24, the shaft 23, and the arm 27 in a clockwise direction, as viewed in Fig. 3, thus forcing the collar 22 along the motor shaft 15 and compressing the spring 21, whereby the brake shoe 18 is pressed against the brake drum 17. The brake shoe 18, which is held stationary by the rod 19, thus quickly stops the rotation of the motor shaft 15 and the vertical shaft 4.

A bracket 29 is suitably secured to the support 2 by the machine screws 30, and carries a timing device which is designated as a whole as T. This timing device may take any suitable form, and in the present embodiment comprises a bellows 31, which is preferably of the metallic compressible type and which is constructed of a metal sufficiently resilient to expand the bellows to a normal position after being compressed. One end of the bellows 31 is secured to a vertical extension 32 of the bracket 29 by suitable means. A vent tube 33 is fixed to the stationary end of the bellows 31, and communicates with the interior thereof. This vent tube 33 is provided with a check valve 34 of the well-known ball type, which check valve communicates directly with the interior of the bellows 31 through the passage 35, and is arranged, as shown, to permit air from within the bellows to be rapidly exhausted therefrom upon the compression thereof, but to prevent the entrance of air to the bellows through this valve. The tube 33 is further provided with a vent 36, which is connected to the interior passage 35 of the tube through an adjustable needle valve 37 of well-known construction, a lock nut 38 being provided to maintain the needle valve in any adjusted position, as will be understood from the showing in Fig. 1. When the bellows 31 is compressed, air is quickly exhausted therefrom through the check valve 34, and when released, the bellows expands at a rate dependent upon the setting of the needle valve 37, the air entering the bellows through the vent 36, the needle valve 37, and the passage 35.

A stud 39 is provided on the free end of the bellows 31, and a rod 40 is threaded into an opening in this stud. The opening in the stud 39 is preferably deep enough to permit the adjustment of the rod 40 axially with respect to the free end of the bellows, and a lock nut 41 is provided to secure this rod in its adjusted position. A boss may be formed on the inner face of the free head of the bellows 31 in alignment with the opening in the stud 39, and this opening may extend into such boss to permit a wide range of adjustment of the rod 40 without extending the opening to penetrate the head.

The rod 40 is bent as shown in Fig. 3, and its free end is journalled in a vertical extension 42 of the bracket 29. A cam 43 is fixed to the vertical shaft 4 in alignment with the free end of the rod 40, this cam being arranged to force the rod 40 to the left as viewed in Figs. 1 and 3, and thereby to compress the bellows 31 at a certain point in the rotation of the shaft 4, the rod 40 being subsequently released by the cam 43 to permit the bellows 31 to expand.

A block 44 of insulating material is secured to the vertical extension 42 of the bracket 29, and carries an electrical contact point 45 with a connected terminal 46. A similar block 47 of insulating material is suitably clamped to the rod 40 at a point adjacent the block 44, and carries a contact point 48 and a terminal 49, the contact points 45 and 48 being in alignment and being arranged to be firmly pressed together when the bellows 31 is expanded to its normal position as shown in Fig. 3. A terminal block 50 of insulating material is secured to the support 2 and carries two double binding posts 51 and 52. Electric power from a suitable source is connected to these binding posts, and the binding post 52 is directly connected to one side of the motor 13 by a wire 53. The other binding post 51 is connected by a wire 54 to the terminal 46 of the fixed contact point 45, and the terminal 49 of the movable contact point 48 is connected by a wire 55 to the opposite side of the motor circuit.

The operation of the device is as follows. Assuming that all of the parts are in their normal positions as shown in Fig. 3, the bellows 31 being expanded and the contact points 45 and 48 being in engagement, an energizing circuit for the motor is completed as follows:—from the binding post 51, the wire 54, terminal 46 and contact point 45, contact point 48 and terminal 49, wire 55, the motor windings and wire 53 to binding post 52. The motor 13, being thus energized, operates and drives the vertical shaft 4 through the worm 16 and the worm gear 9. When the shaft 4 has turned nearly one complete revolution from the position shown, the cam 43 thereon engages the end of the rod 40 and pushes this rod to the left, thus compressing the bellows 31 and moving the contact point 48 out of engagement with the contact point 45, thus opening the motor energizing circuit. The motor is de-energized at this point, but the momentum of its moving parts continues to turn the shaft 4 until the cam 43 has cleared the end of the rod 40. The air in the bellows 31 is forced out, as the bellows is compressed, through the check valve 34, and when the cam 43 moves out of engagement with the end of the rod 40, the bellows expands and returns the rod 40 to its normal position in a period of time which may be adjusted to any given value by adjustment of the opening of the needle valve 37. When the bellows 31 has expanded to its normal position, the movable contact point 48 again engages the stationary contact point 45 and the motor energizing circuit is again completed, whereupon the cycle of operation of the device is repeated.

The brake apparatus on the motor shaft is provided to prevent undue over-running of the mechanism after the motor is de-energized. The cam 12 on the shaft 4 is arranged to engage the set screw 25 on the lever 24 at such a point in the rotation of the shaft 4 that the moving parts of the mechanism are brought to a stop in the required position. The cam 12 forces the lever 24, the shaft 23 and the arm 27 in a clockwise direction, and thus firmly presses the brake shoe 18 against the brake drum 17 on the motor shaft, and quickly bringing the moving parts of the apparatus to a stop, as described above. The position of the shaft 4, at which this braking operation is effective to stop the apparatus, may be adjustably varied by varying the position of the cam 12 on the shaft and varying the effective tension of the brake spring 21 by adjustment of the set screw 25.

From the description given, it is evident that the control apparatus of the present invention operates to successively turn the shaft 4 through one complete revolution at predetermined time intervals. This periodic movement of the shaft 4 may be utilized in any suitable manner to operate switches, valves, signals or other variable devices. In order to illustrate one application of the control apparatus of the present invention, a portion of the control apparatus and circuits of a gas calorimeter has been illustrated in connection therewith, it being understood that this is only one typical adaptation of the control apparatus.

The calorimeter control means shown comprises a dual control valve V, a relay 56 and two float switches 57 and 58. This calorimeter control mechanism is shown and described in detail in a co-pending patent application Serial No. 93,405, filed March 9, 1926, and its construction and operation will not be described in detail herein.

Figure 2:
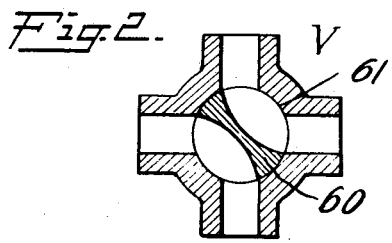
Fig. 2 is a sectional view of a valve mechanism which may be used in connection with one embodiment of the invention.

The valve V has been shown mounted on an extension 59 of the support 2 and comprises two four-way valves having a common valve gate 60. Each valve is arranged to change the connections between four pipes at each quarter revolution of the gate 60, as will be evident from the sectional view of one of these valves shown in Fig. 2. The valve gate 60 is preferably tapered and held in intimate contact with the valve seat 61 by means of a spring 62. A hub 63 is secured to the large end of the gate 60, and carries four radially extending arms 64, spaced ninety degrees apart around the periphery thereof. A radial arm 65 is fixed to the upper end of the vertical shaft 4 in such a position that upon the rotation of this shaft through one revolution, the arm 65 engages one of the arms 64 on the valve gate 60, and turns this gate through ninety degrees, thus altering the connections between the pipes associated with the valves. As shown in Fig. 3, the power circuit 66 for the control apparatus includes the movable contact 67 of a relay 56, this power circuit being closed when the relay is energized. The energizing circuit for the relay 56 includes a suitable source of power such as the battery 68 and the two float switches 57 and 58 in parallel, whereby the closure of either of these switches closes the relay energizing circuit and so closes the power circuit 68.

For the purpose of understanding the operation of the control apparatus of the present invention in connection with the gas calorimeter control means shown, it should be understood that the control valve V, when turned to its successive positions, connects certain pipes to alternately admit and discharge fluids to and from certain reservoirs, and the fluid levels in these reservoirs operates the float switches 57 and 58. In the operation of this apparatus it is essential that the valves be rapidly moved from one position to the other in order that the flow of fluid may not continue for any appreciable time while the valves are in motion, and it is also desired that the valve V remain in a given position for a short interval of time regardless of the condition of the float switches 57 and 58.

In the operation of the apparatus as shown in Fig. 3, one of the reservoirs, say the reservoir associated with the float switch 58, is filled until this switch is closed, the other float switch 57 being open due to the emptying of its associated reservoir during this period. The closure of the switch 58 energizes the relay 56 and thereby closes the power circuit 66, starting the motor 13 and operating the control apparatus to turn the dual valve V through ninety degrees in the manner explained above. When this operation of the control valve V is completed, the reservoir of the float switch 58 is connected to certain pipes to be emptied, and the other reservoir is connected to certain supply means to be filled. Obviously, the float switch 58 does not open immediately upon the operation of the control valve V, but is operated only after a time interval during which the fluid level in the associated reservoir drops an amount sufficient to open this switch. It is therefore essential that the power circuit to the motor 13 be maintained open for a short interval of time after each operation of the valve V to prevent a further operation of this valve before the required flow of fluid to and from the various reservoirs has been completed. This delay is provided by the contact points 45 and 48, operated by the timing device T as described above. After the reservoir of the switch 57 is filled with fluid to a predetermined level, this switch is closed and the valve V is again operated by the control apparatus in the manner described, the contacts 45 and 48 being closed while this reservoir is filling.

From the description given, it is evident that the control apparatus of the present invention presents many advantageous features. The apparatus is adapted for use in connection with devices or systems which are mechanically or electrically operated, and with devices in which a combined mechanical and electrical operation is desired. The time interval of the mechanism may be adjusted to any desired value by the adjustment of the needle valve 37, and the contact pressure between the points 45 and 48 may be varied by adjusting the position of the rod 40 in the bellows 31. Also, the point at which the shaft 4 comes to rest may be varied by suitable adjustment of the set screw 25 and of the position of the cam 12 on the shaft 4. By adjusting the cam 12 to stop the mechanism just as the rod 40 is released by the cam 43, the apparatus may be arranged so that the shaft 4 is turned through a considerable angle before any work is done by the apparatus, and in this manner the motor may be quickly brought up to speed and the moving parts of the apparatus may acquire sufficient momentum to quickly and positively perform the required function.

Although the control mechanism of the present invention has been described in one specific embodiment, and in connection with one specific control system, it should be clearly understood that the invention is not limited to the embodiment shown and is adaptable for use with many other forms of control systems and other apparatus.

We claim:

1. In a control mechanism, a shaft, power operated driving means for driving said shaft, means for cutting off the power from said driving means after said shaft has been driven a predetermined amount, arresting means for arresting the movement of the said driving means and said shaft after the power has been cut off, said arresting means being operated by the momentum acquired by said shaft and said driving means during their operation, and means for again applying power to said driving means after a predetermined time interval.

2. In a control mechanism, an electric motor, means driven by said motor including a shaft, a retarded device moved from its normal position by the rotation of said shaft and adapted to return to said normal position after a predetermined time interval, and means operated by said retarded device for controlling the energization of said motor and adapted to de-energize said motor upon the initial motion of said device by said shaft, said retarded device being moved to its full operated position by the momentum of said motor and the means driven thereby, after the de-energization of said motor.

3. In a control mechanism, an electric motor, apparatus operated by said motor, retarded circuit breaking means initiated by said apparatus to de-energize said motor after said apparatus has been operated a predetermined amount and to re-energize said motor after a predetermined interval of de-energization, means for adjustably varying said time interval of de-energization, arresting means operated by the momentum of said apparatus after said motor is de-energized for stopping the operation of said apparatus, and means for adjustably varying the point in the operation of said apparatus at which said arresting means is effective.

4. In a control mechanism, an electric motor, an energizing circuit for said motor, a shaft driven by said motor, a resilient bellows, a rod adjustably fixed to said bellows, said rod being actuated by said shaft in the rotation thereof to compress said bellows, means for controlling the rate of expansion of said bellows so that said rod will return to a normal position within a predetermined time interval after being actuated by said shaft, and contacts in said motor energizing circuit operated by said rod to close said circuit only when said rod is in said normal position.

5. In a control mechanism, an electric motor, an energizing circuit for said motor, a shaft driven by said motor, a cam fixed to said shaft, a resilient bellows, a rod adjustably fixed to said bellows, said cam actuating said rod by rotation of said shaft to compress said bellows, a check valve attached to said bellows arranged to allow the air to rapidly exhaust when said bellows are compressed, a needle valve for regulating the rate of admission of air to the bellows, whereby said rod will return to a normal position within a predetermined time interval after being actuated by said cam, and contacts in said motor energizing circuit operated by said rod to close said circuit only when said rod is in said normal position.

6. In a control mechanism, an electric motor having a shaft, an energizing circuit for said motor, a worm carried by said motor shaft, a second shaft, a worm gear attached to said second shaft and driven by said worm, a cam fixed to said second shaft, a resilient bellows, a rod adjustably fixed to said bellows, said cam actuating said rod by rotation of the second shaft to compress said bellows, a ball check valve for permitting air to rapidly exhaust when said bellows are compressed and to prevent the entrance of air when said bellows are expanding, a needle valve to control the rate of expansion of said bellows so that said rod will return to a normal position within a predetermined time interval after being actuated by said cam, and contacts in said motor energizing circuit operated by said rod to close said circuit only when said rod is in said normal position.

7. In a control mechanism, an electric motor, an energizing circuit for said motor, a shaft driven by said motor, a retarded device initiated by said shaft during the rotation thereof, said retarded device being adapted to return to a normal position in a predetermined time interval after being initiated by said shaft, contacts in said motor energizing circuit operated by said retarded device to close said circuit only when said device is in said normal position and arresting means operated by the rotation of said shaft to arrest the motion of the motor and shaft after said retarded device has been moved a predetermined distance from its normal position by said shaft.

8. In a control mechanism, an electric motor, an energizing circuit for said motor, a shaft driven by said motor, a cam fixed to said shaft, a resilient bellows, a rod adjustably fixed to said bellows, said cam actuating said rod by the rotation of the shaft to compress said bellows, means adapted to control the rate of expansion of said bellows to return said rod to a normal position in a predetermined time interval after being actuated by said cam, contacts in said motor energizing circuit operated by said rod to close said circuit only when said rod is in said normal position, a second cam adjustably fixed to said shaft, and arresting means actuated by said second cam to arrest the motion of said motor and said shaft after said first cam has disengaged said rod.

In testimony whereof we affix our signatures.

HAROLD L. PARR.
JOHN H. NELSEN.